United States Patent
Sugimoto et al.

(10) Patent No.: US 7,553,887 B2
(45) Date of Patent: *Jun. 30, 2009

(54) RESIN COMPOSITION FOR AUTOMOTIVE PARTS

(75) Inventors: Yoshio Sugimoto, Sodegaura (JP); Ikunori Sakai, Sodegaura (JP); Yusuke Umetani, Toyota (JP); Naoki Shoji, Toyota (JP); Keita Nagano, Nara (JP); Takao Mizoshita, Yao (JP); Isamu Yamaguchi, Tokyo (JP)

(73) Assignee: Prime Polymer Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/645,608

(22) Filed: Aug. 22, 2003

(65) Prior Publication Data

US 2005/0250892 A1  Nov. 10, 2005

(30) Foreign Application Priority Data

Aug. 22, 2002 (JP) ............................. 2002-242216

(51) Int. Cl.
```
C08J 3/00      (2006.01)
C08K 3/08      (2006.01)
C08K 9/00      (2006.01)
C08K 9/04      (2006.01)
C08L 53/00     (2006.01)
C08L 83/00     (2006.01)
C09B 67/00     (2006.01)
C09D 5/38      (2006.01)
C09J 7/02      (2006.01)
```
(52) U.S. Cl. .................. 523/200; 523/202; 523/205; 523/206; 524/441; 524/502; 524/505; 525/88; 525/93; 525/95

(58) Field of Classification Search ............... 523/205, 523/200, 202, 206; 524/451, 441, 502, 505; 428/407; 525/88, 93, 95
See application file for complete search history.

(56) References Cited

U.S. PATENT DOCUMENTS

| | | | | | |
|---|---|---|---|---|---|
| 3,932,320 | A | * | 1/1976 | Camelon et al. | 523/205 |
| 4,434,009 | A | * | 2/1984 | Banba | 524/212 |
| 5,856,400 | A | * | 1/1999 | Matsumura et al. | 524/525 |
| 6,017,989 | A | * | 1/2000 | Malm et al. | 524/440 |
| 6,169,144 | B1 | * | 1/2001 | Higashi et al. | 525/88 |
| 6,541,540 | B2 | * | 4/2003 | Hashizume | 523/205 |
| 6,838,510 | B2 | * | 1/2005 | Sugimoto et al. | 524/451 |

FOREIGN PATENT DOCUMENTS

| | | | | |
|---|---|---|---|---|
| JP | 61-49817 A | | | 3/1986 |
| JP | 61-159453 A | | | 7/1986 |
| JP | 62-95345 A | | | 5/1987 |
| JP | 62-96565 A | | | 5/1987 |
| JP | 62-96566 A | | | 5/1987 |
| JP | 01040566 A | * | | 2/1989 |
| JP | 08-239549 A | | | 9/1996 |
| JP | 2000-309638 A | | | 11/2000 |
| JP | 2000-313747 A | | | 11/2000 |
| JP | 2000-313758 A | | | 11/2000 |
| WO | WO 0294933 A1 | * | | 11/2002 |

OTHER PUBLICATIONS

USPTO obtained translation of JP 01-40566 A (Baba et al.).*

* cited by examiner

*Primary Examiner*—Patrick D Niland
(74) *Attorney, Agent, or Firm*—Birch, Stewart, Kolasch & Birch, LLP

(57) ABSTRACT

To provide a resin composition comprising a polypropylene resin composition and an aluminum flake pigment for use as an automotive resin composition, which is excellent in mechanical strength, physical properties and flowability, and enables to produce molded products showing good metallic appearance.

A composition comprising a crystalline propylene/ethylene block copolymer, an elastomeric polymer and an inorganic filler is a preferred example of the polypropylene resin composition, and aluminum flakes surface-coated with a polymer containing as constituent units acrylic acid, an acrylic acid ester, epoxylated polybutadiene and divinylbenzene are preferred examples of the aluminum flake pigment.

8 Claims, No Drawings

RESIN COMPOSITION FOR AUTOMOTIVE PARTS

This nonprovisional application claims priority under 35 U.S.C. § 119(a) on Patent Application No. 2002-242216 filed in Japan on Aug. 22, 2002, which is herein incorporated by reference.

TECHNICAL FIELD

The present invention relates to a resin composition suitable for producing automotive parts having a good metallic appearance. More particularly, the present invention relates to a resin composition for automotive parts comprising a polypropylene composition and aluminum flakes.

TECHNICAL BACKGROUND

Polypropylene resins are utilized as molding materials in various fields, including convenience goods, kitchenware, wrapping films, automotive parts, machine parts, electrical parts, etc. Practically, propylene resins are used in the form of compositions by adding thereto various compounding ingredients or additives, depending on performances required for individual products. In the fields of, e.g., automotive exterior parts, etc. that require mechanical strength, propylene resin compositions wherein elastomers, talc, etc. are formulated have been utilized.

In view of recent trends in large-sized, thin-wall automotive exterior parts and a simplified process for manufacturing parts, it is required for the polypropylene resins to have more improved mechanical and physical properties such as impact resistance, flexural modulus, etc., to hardly cause flow marks or weld marks and to have high flowability enabling to cope with paintless finish.

On the other hand, unity in design with the body part weighed heavily in automotive exterior parts. Such unity was achieved so far, either by blending polypropylene resins with various colorants and then molding the blend, or by painting molded articles in the same color as the body part. Taking into account the simplified manufacturing process and recyclability of materials, such a polypropylene resin composition that can deal with non-painting and shows an good visual appearance, has now been demanded.

In order to meet the demand for non-painting, there was proposed a technique of blending polypropylene resins with aluminum flakes frequently applied, e.g., to paints for body, thereby imparting a metallic appearance similar to metallic coatings. However, because of poor compatibility with polypropylene resins, aluminum flakes used for paints tend to separate from polypropylene resins and readily agglomerate during the processing of melt molding, which makes difficult to stably produce molded articles exhibiting a good metallic appearance. Especially in polypropylene resins having improved flowability to deal with large-sized, thin-wall automotive exterior parts, a tendency to cause separation and agglomeration of aluminum flakes is observed notably.

DESCRIPTION OF THE INVENTION

It is an object of the present invention to provide a resin composition for automotive parts, which is excellent in mechanical strength, physical properties and flowability, and enables to produce molded products showing a good metallic appearance.

The present invention provides a resin composition for automotive parts comprising:

(1) a propylene polymer composition comprising 50 to 70% by weight of a crystalline propylene/ethylene block copolymer (a-1) or a blend of (a-1) and a crystalline propylene homopolymer (a-2) of not greater than an equivalent weight of (a-1), 18 to 25% by weight of an elastomeric polymer (b) and 15 to 25% by weight of an inorganic filler (c) (wherein the total amount of the individual components is made 100% by weight); and, (2) an aluminum flake pigment comprising aluminum flakes, which surface is coated with a polymer containing as constituent units acrylic acid, an acrylic acid ester, epoxylated polybutadiene and divinylbenzene.

Preferred examples of the propylene polymer composition described above is a propylene polymer composition wherein the melt flow rate (ASTM D-1238, 230° C., 2160 g load), flexural modulus (ASTM D-790) and brittleness temperature (ASTM D-746) are 30 to 70 g/10 min, 1900 to 3000 MPa and −10 to −40° C., respectively.

A preferred example of the crystalline propylene/ethylene block copolymer (a-1) is a crystalline propylene/ethylene block copolymer composed of a propylene homopolymer portion and a propylene/ethylene random copolymer portion, wherein the melt flow rate (ASTM D-1238, 230° C., 2160 g load) is 70 to 130 g/10 min, the isotactic pentad fraction (mmmm fraction) in the propylene homopolymer portion is not less than 97% as measured by $^{13}$C-NMR and the content of propylene/ethylene random copolymer portion is 5 to 20% by weight.

A preferred example of the crystalline propylene homopolymer (a-2) described above is a crystalline propylene homopolymer wherein the isotactic pentad fraction (mmmm fraction) is not less than 97% and the melt flow rate (ASTM D-1238, 230° C., 2160 g load) is 100 to 300 g/10 min A preferred example of the elastomeric polymer (b) described above is an elastomeric polymer comprising a copolymer rubber (b-1) of ethylene and an α-olefin of at least 6 carbon atoms having a melt flow rate (ASTM D-1238, 230° C., 2160 g load) of 0.5 to 10 g/10 min, anethylene/α-olefin/ nonconjugated polyene random copolymer (b-2) having a melt flow rate (ASTM D-1238, 230° C., 2160 g load) of not greater than 1 g/10 min, and a hydrogenated block copolymer (b-3) that is a hydrogeneted product of a block copolymer containing a polymer block of monovinyl-substituted aromatic hydrocarbon compound and a polymer block of conjugated diene compound.

PREFERRED EMBODIMENTS OF THE INVENTION

Next, the resin composition for automotive parts in accordance with the present invention and the individual components that constitute the resin composition are specifically described below.

Propylene Polymer Composition

The propylene polymer composition which can be used in the present invention comprises the following components in the ratios given below:

(1) 50 to 70% by weight, preferably 55 to 65% by weight of the crystalline propylene/ethylene block copolymer (a-1) or a blend of (a-1) and the crystalline propylene homopolymer (a-2) of not greater than the equivalent weight of (a-1);

(2) 18 to 25% by weight, preferably 19 to 24% by weight of the elastomeric polymer (b); and, (3) 15 to 25% by weight, preferably 18 to 23% by weight of the inorganic filler (c). Herein, the total amount of the individual components is 100% by weight.

The propylene polymer composition having the composition as described above is excellent in flowability upon molding, provides superior physical properties such as flexural modulus, impact resistance, hardness, brittleness temperature, etc., and gives a good balance among these physical properties. Therefore, the propylene polymer composition can be advantageously used as a raw resin for injection molding, exhibits good moldability in injection molding and can easily manufacture injection molded products having excellent dimensional stability.

In the propylene polymer composition described above, the composition which satisfies the following physical properties is preferred as raw components that constitute the resin composition for automotive parts:

(1) the melt flow rate (MFR: ASTMD-1238, 230° C., 2160 g load) is preferably 30 to 70 g/10 min, more preferably 35 to 60 g/10 min;

(2) the flexural modulus (ASTM D-790) is preferably 1900 to 3000 MPa, more preferably 1900 to 2500 MPa; and, (3) the brittleness temperature (ASTM D-746) is preferably −10 to −40° C., more preferably −20 to −35° C.

The crystalline propylene/ethylene block copolymer (a-1) is employed either alone or as an admixture of the block copolymer (a-1) and the crystalline propylene homopolymer (a-2) of not greater than the equivalent weight of (a-1).

The propylene/ethylene block copolymer (a-1) is composed of the propylene homopolymer portion and the propylene/ethylene random copolymer portion. The content of the propylene homopolymer portion is preferably 80 to 95% by weight, more preferably 87 to 92% by weight, and the content of the propylene/ethylene random copolymer portion is preferably 5 to 20% by weight, more preferably 8 to 13% by weigh. Herein, the total amount of the two components becomes 100% by weight.

The contents of the two components described above can be measured by fractionating a sample of the block copolymer at room temperature using p-xylene as a solvent and determined from the results of fractionation. In one example of such measurement methods, 5 g of the block copolymer sample is completely dissolved in boiled p-xylene; after the temperature is lowered to 20° C., the resulting solution is allowed to stand overnight and then filtered to remove the insoluble matters. Subsequently, 1500 ml of methanol is added to the filtrate and the mixture is stirred. The soluble matter is separated as precipitates, which are taken out by filtration and dried to give the p-xylene-soluble matter. Since the soluble matter is the propylene/ethylene random copolymer portion, the content of the propylene/ethylene random copolymer portion can be determined by weighing the portion.

The propylene homopolymer portion shows the isotactic pentad fraction (mmmm) of not less than 97%, as measured by $^{13}$C-NMR, more preferably not less than 97.5%. Herein, the isotactic pentad fraction (mmmm fraction) indicates a ratio of isotactic chains in a pentad unit in the crystalline polypropylene molecule chain, which is measured using $^{13}$C-NMR. Specifically, the isotactic pentad fraction is determined to be a ratio of the absorption peak, in a $^{13}$C-NMR spectrum, of the propylene monomer unit located at the center of consecutive five propylene monomer units, which are bonded to each other with meso form, to all absorption peaks in the methyl carbon region. It is desired for the propylene homopolymer portion to have MFR (230° C., 2160 g load) of preferably 100 to 300 g/10 min, more preferably 120 to 250 g/10 min The propylene/ethylene random copolymer portion has an intrinsic viscosity [η] of preferably 6 to 9 dl/g, as measured at 135° C. in decahydronaphthalene, wherein the ethylene content is preferably 20 to 40% by weight, more preferably 24 to 32% by weight.

In the block copolymer (a-1), the content of ethylene units is preferably in the range of 1 to 10% by weight, more preferably 3 to 8% by weight. The content of ethylene units in the block copolymer can be determined by subjecting a pressed film of the block copolymer (a-1) sample to IR absorption spectrometry, that is, by measuring absorbance at 1155 cm$^{-1}$ based on the methyl group and absorbance based on the methylene group and applying Gardner's calibration curve thereto (I. J. Gardner et al., Rubber Chem. And Tech., 44, 1015, 1971).

As the crystalline propylene/ethylene block copolymer (a-1), there are employed those having a melt flow rate (MFR: 230° C., 2160 g load) of preferably 70 to 130 g/10 min, more preferably 80 to 120 g/10 min, as measured in accordance with ASTM D-1238. When a block copolymer having MFR smaller than the range described above is used, such a resin composition for automotive parts as finally obtained tends to cause flow marks or weld marks on the surface of molded products, and a thermal shrinkage rate of the molded products tends to become large. The crystalline propylene/ethylene block copolymer (a-1) can be employed solely or in combination of two or more.

In the present invention, the blend wherein a half or less than the half of the crystalline propylene/ethylene block copolymer (a-1) is replaced by the crystalline propylene homopolymer (a-2) may be used instead of the block copolymer (a-1). As the crystalline propylene homopolymer (a-2), a crystalline propylene homopolymer having an isotactic pentad fraction of preferably not less than 97%, more preferably not less than 97.5%, and a melt flow rate (MFR: 230° C., 2160 g load) of preferably 100 to 300 g/10 min, more preferably 120 to 250 g/10 min is preferred.

The crystalline propylene/ethylene block copolymer (a-1) can be produced by various methods. For example, the crystalline propylene/ethylene block copolymer (a-1) can be produced using conventionally known stereoregular catalysts for olefins, such as a Ziegler-Natta catalyst, a metallocene type catalyst, etc. In an example of the methods for producing the block copolymer (a-1) using a Ziegler-Natta catalyst, propylene is polymerized in the presence of a catalyst composed of, e.g., a solid titanium catalyst component, an organo-metallic compound catalyst component and, as required, an electron donor, followed by copolymerization of propylene and ethylene. The crystalline propylene homopolymer (a-2), which can be used together with the crystalline propylene/ethylene block copolymer (a-1), may be produced as well, using these stereoregular catalysts for olefins.

The elastomeric polymer (b) is not particularly restricted in its kind and amount used. A preferred embodiment is a combination of the following polymers. That is, a preferred elastomeric polymer contains, based on 100% by weight of the propylene polymer composition:

(1) preferably 10 to 20% by weight, more preferably 13 to 19% by weight of the copolymer rubber (b-1) of ethylene and an α-olefin having at least 6 carbon atoms;

(2) preferably 1 to 5% by weight, more preferably 2 to 5% by weight of the ethylene/α-olefin/nonconjugated polyene random copolymer (b-2); and, (3) preferably 1 to 10% by weight, more preferably 3 to 8% by weight of the hydrogenated block copolymer (b-3) that is a hydrogenated product of a block copolymer containing the polymer block of monovinyl-substituted aromatic hydrocarbon compound and the polymer block of conjugated diene compound. The elastomeric polymer may be used solely or in combination of two or more.

The copolymer rubber (b-1) of ethylene and an α-olefin having at least 6 carbon atoms is a rubber-like copolymer obtained by copolymerization of ethylene with an α-olefin having at least 6 carbon atoms, preferably 6 to 12 carbon atoms, e.g., 1-hexene, 4-methyl-1-pentene, 1-octene, 1-decene, 1-dodecene, etc. The weight ratio of ethylene to the α-olefin having at least 6 carbon atoms (ethylene/α-olefin having at least 6 carbon atoms) in the copolymer is preferably in the range of 90/10 to 50/50, more preferably in the range of 80/20 to 60/40.

As the copolymer rubber (b-1), it is desired to use the copolymer rubber showing MFR (ASTM D-1238, 230° C., 2160 g load) of preferably 0.5 to 10 g/10 min, more preferably 1 to 8 g/10 min. When the copolymer rubber having MFR within the range given above is used, rigidity or low temperature impact resistance of molded products finally obtained can be improved.

The ethylene/α-olefin copolymer rubber (b-1) can be prepared by copolymerization of ethylene and an α-olefin having at least 6 carbon atoms in the presence of a stereoregular catalyst for olefins. In particular, the ethylene/α-olefin copolymer prepared using a single site catalyst has a narrow range of molecular distribution and compositional distribution, and thus provides an excellent effect in improving impact resistance at low temperatures. Examples of such a single site catalyst include a metallocene type catalyst containing a metallocene compound wherein a compound having the cyclopentadienyl skeleton is coordinated on a transition metal such as zirconium metal, etc., and an organoaluminum oxy-compound, or the like.

The ethylene/α-olefin/nonconjugated polyene random copolymer (b-2) is a random terpolymer rubber of ethylene, an α-olefin and a nonconjugated polyene. The α-olefin is an α-olefin generally having 3 to 20 carbon atoms, preferably 3 to 10 carbon atoms, and specific examples include propylene, 1-butene, 1-pentene, 1-hexene, 1-octene, 1-decene, 4-methyl-1-pentene, etc.

Examples of the nonconjugated polyene described above include a cyclic nonconjugated diene such as 5-ethylidene-2-norbornene, 5-propylidene-2-norbornene, dicyclopentadiene, 5-vinyl-2-norbornene, 5-methylene-2-norbornene, 5-isopropylidene-2-norbornene, norbornadiene, etc.; a linear nonconjugated diene such as 1,4-hexadiene, 4-methyl-1,4-hexadiene, 5-methyl-1,4-hexadiene, 5-methyl-1, 5-heptadiene, 6-methyl-1,5-heptadiene, 6-methyl-1,7-octadiene, 7-methyl-1,6-octadiene, etc.; a triene such as 2,3-diisopropylidene-5-norbornene, etc. Among these polyenes, 1,4-hexadiene, dicyclopentadiene and 5-ethylidene-2-norbornene are preferably employed.

As the ethylene/α-olefin/nonconjugated polyene random copolymer (b-2), it is desired to use the random copolymer showing MFR (ASTM D-1238, 230° C., 2160 g load) of preferably not more than 1 g/10 min, more preferably 0.1 to 0.5 g/10 min. When the random copolymer of MFR within the range given above is employed, a tendency that flow marks or weld marks occur on the surface of molded products produced from the resin compositions finally obtained can be avoided.

Desirably, the copolymer (b-2) has the copolymerization rate of ethylene to the α-olefin preferably in the range of 90/10 to 40/60, more preferably 85/15 to 50/50, as expressed in a molar ratio (ethylene/α-olefin). A ratio of the nonconjugated polyene is preferably in the range of 1 to 40, more preferably in the range of 2 to 35, when expressed by an iodine value of the random copolymer (b-2).

Representative examples of the ethylene/α-olefin/nonconjugated polyene random copolymer (b-2) include ethylene/propylene/diene terpolymer (EPDM) and ethylene/1-butene/diene terpolymer.

The hydrogenated block copolymer (b-3) that is a hydrogenated product of a block copolymer containing the polymer block of monovinyl-substituted aromatic hydrocarbon compound and the polymer block of conjugated diene compound is a hydrogenated product obtained by hydrogenation of the block copolymer represented by formula (1) or (2) below, at the Y portion thereof:

wherein X is the polymer block of monovinyl-substituted aromatic hydrocarbon, Y is the polymer block of conjugated diene, and n is an integer of 1 to 5, preferably 1 or 2.

Examples of the monovinyl-substituted aromatic hydrocarbon, which constitutes the polymer block shown by X in the formula (1) or (2) above, include styrene or derivatives thereof, such as styrene, α-methylstyrene, p-methylstyrene, chlorostyrene, a lower alkyl-substituted styrene, vinylnaphthalene, etc. These monovinyl-substituted aromatic hydrocarbons may be used alone or in combination of two or more. Styrene is particularly preferred.

Examples of the conjugated diene, which constitutes the polymer block represented by Y in the formula (1) or (2) above, include butadiene, isoprene, chloroprene, etc. These dienes may be used alone or in combination or two or more. Particularly preferred is butadiene or isoprene. Where butadiene is employed as the conjugated diene, it is desired that a ratio of the 1,2-bond in the polybutadiene block is preferably 20 to 80% by weight, more preferably 30 to 60% by weight.

In the hydrogenated block copolymer (b-3), a hydrogenation degree in the conjugated diene polymer block (Y portion) is preferably not less than 90 mol %, more preferably not less than 95 mol %, the content of X portion is preferably 10 to 25% by weight, and MFR (ASTM D-1238, 190° C., 2160 g load) is preferably not more than 15 g/10 min, more preferably 1 to 10 g/10 min Where the block copolymer having the content of X portion within the range given above is employed, a thermal shrinkage rate of molded articles produced from the resin composition finally obtained becomes small and their brittleness temperature is low.

Specific examples of the hydrogenated block copolymer (b-3) are styrene-based block copolymers such as styrene/ethylene/butene/styrene block copolymer (SEBS) obtained by hydrogenation of styrene/butadiene/styrene tri-block copolymer, styrene/ethylene/propylene/styrene block copolymer (SEPS) obtained by hydrogenation of styrene/isoprene/styrene tri-block copolymer, styrene/ethylene/propylene block copolymer (SEP) obtained by hydrogenation of styrene/isoprene di-block copolymer, etc.

The block copolymer prior to the hydrogenation can be prepared, e.g., by conducting block copolymerization of the respective monomers in an inert solvent in the presence of a lithium catalyst or a Ziegler catalyst. Such a method is described in detail in, e.g., Japanese Patent Publication No. SHO 40-23798, etc.

The hydrogenation of the conjugated diene polymer block can be carried out by adding the block copolymer described above to an inert solvent in the presence of a known catalyst for hydrogenation. Such a method is described in detail in, e.g., Japanese Patent Publication Nos. SHO 42-8704, SHO 43-6636, SHO 46-20814, etc.

The hydrogenated block copolymer (b-3) is commercially available under trade names of Kraton G1657 (manufactured by Shell Chemical Co., Ltd., trademark), Septon 2004(manufactured by Kuraray Co., Ltd., trademark), Tuftec H1052 and Tuftec 1062(Asahi Kasei Corporation, trademark), etc., and these commercial products may be used.

Examples of the inorganic filler (c) include talc, clay, calciumcarbonate, mica, silicates, carbonates, glass fibers, etc. Among them, talc is particularly preferred. Talc having an average particle size of 1 to 10 μm, preferably 2 to 6 μm, as measured by laser analysis, is preferred as talc. The inorganic filler may be used alone or in combination of two or more.

Aluminum Flake Pigment

The aluminum flake pigment which can be used in the present invention comprises aluminum flakes, which surface is coated with a polymer containing as constituent units acrylic acid, an acrylic acid ester, epoxylated polybutadiene and divinylbenzene.

Herein, aluminum flakes can be produced by methods conventionally known, for example, by milling or grinding atomized powders, aluminum foils, deposited aluminum foils, etc., using a ball mill, an attriter, a stamp mill, etc. Particularly preferred are aluminum flakes obtained by grinding aluminum powders prepared by atomization technique using a ball mill. The purity of aluminum is not particularly restricted, but aluminum may be in the form of alloy with other metals, so long as it is extendable. Examples of alloy metals are Si, Fe, Cu, Mn, Mg, Zn, etc.

Examples of the acrylic acid ester include an alkyl acrylate, a hydroxyalkyl acrylate, an ester of acrylic acid and polyol, etc. As the epoxylated polybutadiene, epoxylated 1,2-polybutadiene having a polymerization degree of 3 to 10 is preferred.

By incorporating acrylic acid and acrylic acid ester units into the polymer with which the surface of aluminum flakes is coated, a coat having transparency, adhesiveness, weatherproof and chemical resistance is formed; corrosion resistance of the coat is improved by a cross-linking effect of the divinylbenzene unit contained. Furthermore, in the polymerization between the individual components, the reaction efficiency is enhanced by the polymerizable double bond that the epoxylated polybutadiene has.

The amount of the polymer which coats the surface of aluminum flakes is preferably 0.5 to 20 parts by weight, more preferably 1 to 15 parts by weight, based on 100 parts by weight of aluminum flakes. Within the range above, a coat in a uniform thickness having the physical properties described above is formed on the surface of aluminum flakes to provide good and uniform compatibility with the propylene polymer composition.

An example of the methods for producing such surface-coated aluminum flakes is explained below. While aluminum flakes are suspended in an organic solvent which dissolves the respective component monomers but does not dissolve the formed polymer, the respective monomers of acrylic acid, acrylic acid ester, epoxylated polybutadiene and divinylbenzene are polymerized in the presence of a polymerization initiator, whereby the surface of aluminum flakes is coated with the polymer.

Examples of the organic solvent which is usable in the reaction include an aliphatic hydrocarbon such as hexane, heptane, octane, cyclohexane, etc.; an aromatic hydrocarbon such as benzene, toluene, xylene, etc.; a solvent mixture of an aliphatic hydrocarbon and an aromatic hydrocarbon, such as mineral spirit, etc.; a halogenated hydrocarbon such as chlorobenzene, trichlorobenzene, perchloroethylene, trichloroethylene, etc.; an alcohol such as methanol, ethanol, n-propanol, n-butanol, etc.; a ketone such as 2-propanone, 2-butanone, etc.; an ester such as ethyl acetate, propyl acetate, etc.; an ether such as tetrahydrofuran, diethyl ether, ethylpropyl ether, etc.

Desirably, the organic solvent described above is used in an amount of 300 to 3000 parts by weight, preferably 500 to 1500 parts by weight, based on 100 parts by weight of aluminum flakes. When the organic solvent is used within the range above, a viscosity of the solvent is kept optimum so that reactants are uniformly dispersed and polymerization proceeds at an optimum reaction rate.

Examples of the polymerization initiator include radical generators such as di-t-butyl peroxide, acetyl peroxide, benzoyl peroxide, lauroyl peroxide, cumyl hydroperoxide, t-butylhydroperoxide, α,α'-azobisisobutyronitrile, etc. The polymerization initiator is used preferably in an amount of 0.1 to 1 part by weight, based on 100 parts by weight of aluminum flakes. With the amount within the range above, the polymerization proceeds at an optimum rate, aluminum flakes do not agglomerate, and a good color hue is maintained.

In general, the polymerization is carried out in an inert gas such as argon gas, nitrogen gas, etc. The temperature is preferably in the range of 60 to 200° C. When the polymerization is carried out within this temperature range, the polymerization rate is kept optimum so that the polymer produced deposits uniformly on the surface of aluminum flakes and adheres thereto.

An appropriate time period for the polymerization is 0.5 to 24 hours. After the polymerization is completed, the solvent is removed through a filtering device, etc. to give a wet paste. The paste can be used as it is, as one component of the resin composition.

It is preferred for the aluminum flake pigment coated with such a polymer to have a particle diameter of 10 to 100 μm. The aluminum flake pigment provides a good and uniform compatibility with the propylene polymer composition. Furthermore, the metallic appearance and brightness on the surface imparted by the pigment are hardly affected by the polymer coating, and continue over a long period of time because of corrosion resistance and weatherproof that the coat possesses.

Resin Composition

The resin composition for automotive parts in accordance with the present invention is a composition comprising the propylene polymer composition and the aluminum flake pigment described above. The aluminum flake pigment is contained preferably in 0.005 to 10 parts by weight, more preferably 0.1 to 2 parts by weight, based on 100 parts by weight of the propylene polymer composition.

When a mixing ratio of the propylene polymer composition and the aluminum flakes is within the range described above, it becomes easy to blend the two components uniformly. Thus, high mechanical strength and flowability of the propylene polymer composition are exhibited, and the metallic appearance and brightness of aluminum flakes are also displayed. Accordingly, the surface appearance of molded articles produced from the composition is excellent.

Where the propylene polymer composition are obtained in the form of pellets wherein the components (a-1), (a-2), (b)

and (c) are previously blended, the resin composition can be prepared by melt-kneading together the propylene polymer composition pellets, the aluminum flake pigment and additives added as required, using mixing devices such as a Banbury mixer, a monoaxial extruder, etc. When a biaxial extruder is employed for mixing, it is desired to adopt such a method that the propylene polymer composition pellets are fed through a main feeder and the aluminum flake pigment is fed through a side feeder, in order to protect the surface resin-coated layer of the aluminum flake pigment. Also where the individual components that constitute the propylene polymer composition are blended with the aluminum flake pigment all at once in one step, it is desired to feed the aluminum flake pigment through a side feeder. The aluminum flake pigment itself may be used for mixing, and in order to improve its uniform dispersion, a master batch of the pigment together with polyethylene, polypropylene, etc. may be previously prepared, followed by blending the master batch with the other components.

Preferably, the resin composition of the present invention is used in combination with colorants such as carbon black, titanium oxide, etc. If necessary and desired, other additives such as a heat resistant stabilizer, an antistatic agent, a weatherproof stabilizer, a light stabilizer, an anti-aging agent, an antioxidant, a UV absorbent, a softener, a dispersant, a lubricant, etc., or other polymers, may further be formulated in the resin composition within such a range that does not damage the objects of the invention.

These resin compositions can be advantageously used for molding automotive parts, especially automotive exterior trims, e.g., for molding parts such as bumpers, overfenders, side moldings, rocker moldings, etc.

According to the present invention, aluminum flakes are uniformly dispersed in the propylene polymer composition, whereby the resin composition can be obtained totally in a uniformly blended form. Thus, the surface of molded articles produced from the resin composition finally obtained exhibits the metallic appearance and brightness originally possessed by the aluminum flakes to provide a good appearance.

Furthermore, the resin composition of the present invention has excellent mechanical strength and physical properties as observed with its flexural modulus or IZOD impact strength, and has a high flowability as shown by its spiral flow length. Accordingly, the resin composition can avoid the occurrence of flow marks or weld marks. For these reasons, the resin composition is suitable for preparing automotive parts, especially exterior trim moldings.

EXAMPLES

Next, the present invention is described in more detail, by way of EXAMPLES but is not deemed to be limited thereto.

First, various raw materials employed in EXAMPLES are explained below.

(1) Propylene Polymer Composition

The crystalline propylene/ethylene block copolymer, the elastomeric polymer and the inorganic filler were blended in proportions shown in Table 1 to give two propylene polymer compositions (A-1 and A-2). The melt flow rate, flexural modulus and brittleness temperature were measured and the obtained results are also shown in Table 1.

a. Crystalline Propylene/Ethylene Block Copolymer:
  MFR (230° C., 2160 g load): 100 g/10 min
  Propylene homopolymer portion: 90% by weight
    Isotactic pentad fraction (mmmm fraction): 98%
  Propylene/ethylene random copolymer portion: 10% by weight
    Intrinsic viscosity [η]: 7.5 dl/g (135° C., as measured in decahydronaphthalene solvent)
    Ethylene content: 26% by weight b. Elastomeric Polymer:
  b-1: Ethylene/1-octene random copolymer rubber
    Polymer prepared using a metallocene catalyst
    1-Octene content: 27% by weight
    MFR (230° C., 2160 g load): 2 g/10 min
  b-2: Ethylene/propylene/5-ethylidene-2-norbornene terpolymer
    MFR (230° C., 2160 g load): 0.4 g/10 min
    Propylene content: 28% by weight
    Iodine value: 15
  b-3: Styrene/ethylene/butene/styrene block copolymer (SEBS)
    MFR (230° C., 2160 g load): 4.5 g/10 min
    Styrene content: 20% by weight c. Inorganic Filler: Talc
  Average particle size: 4 μm

TABLE 1

|  | Propylene polymer composition A-1 | Propylene polymer composition A-2 |
|---|---|---|
| Composition of PP resin composition (% by weight) | | |
| Block copolymer | 59 | 50 |
| Elastomeric polymer | | |
| b-1 | 13 | 22 |
| b-2 | 3 | 3 |
| b-3 | 5 | 5 |
| Talc | 20 | 20 |
| Physical properties of PP resin composition | | |
| MFR (g/10 min) | 40 | 35 |
| Flexural Modulus (MPa) | 1980 | 1600 |
| Brittleness temperature (° C.) | −30 | −38 |

(2) Aluminum Flake Pigment

B-1: Surface-Coated Aluminum Flakes

In a four-necked flask of 2 litter volume, 0.3 g of acrylic acid, 3.7 g of trimethylolpropane acrylate, 1.5 g of divinylbenzene, 3.2 g of epoxylated 1,2-polybutadiene, 200 g of aluminum flakes (average particle size of 60 μm, manufactured by Toyo Aluminium Kabushiki Kaisha, G type) and 1150 g of mineral spirit were charged. After nitrogen gas was introduced, the mixture was thoroughly mixed while stirring. The temperature in the reaction system was elevated to 80° C., and 1.1 g of α,α'-azobisisobutyronitrile was added to the mixture. The reaction was continued at 80° C. for 2 hours. The resulting slurry was subjected to solid-liquid separation to give wet resin-coated aluminum flake pigment having a solid content of 85% by weight. The amount of the resin coated was 3.5 g based on 100 g of aluminum flakes.

Next, 20 parts by weight of the surface-coated aluminum flakes, 77 parts by weight of linear low density polyethylene and 3 parts by weight of magnesium stearate (manufactured by NOF Corporation) as a dispersant were blended and melt-kneaded to prepare the master batch of aluminum flakes.

B-2: Aluminum Flakes without Surface Coat Treatment
   Average particle size of 60 μm, manufactured by Toyo Aluminium Kabushiki Kaisha, G type (3) Titanium Oxide
   CR-50 Titanium, available from Ishihara Sangyo Kaisha, Ltd.
   Average particle size: 0.25 μm
   Product with aluminum-treated surface (4) Carbon Black
   Product from Mitsubishi Chemical Corporation
   Trade name: Carbon Black #45
   Average particle size of 24 mμ
   RCF furnace type Next, in order to evaluate the physical properties of the resin compositions obtained in EXAMPLES and COMPARATIVE EXAMPLES and molded articles produced therefrom, various tests were performed by the methods described below.

(1) Melt Flow Rate (MFR):
   The test was performed in accordance with ASTM D-1238. Measurement conditions: 230° C. under the load of 2160 g.

(2) Flexural Modulus:
   The test was performed in accordance with ASTM D-790.

(3) IZOD Impact Strength:
   The test was performed in accordance with ASTM D-256 (notched).

(4) Spiral Flow Length:
   Using a mold for resin flow length measurement having a spiral flow path of 3 mm thick, 10 mm wide and 2000 mm long, the resin composition was molded at 230° C. of resin temperature. The flow length (mm) of the molded product obtained was measured and its length was made a spiral flow length.

(5) Test on Agglomeration of Aluminum Flakes
   Using a mold of 3 mm thick, 120 mm wide and 130 mm long, equipped with a side gate of 4 mm wide and 2 mm high at the center of the lateral side in the width direction, the resin composition was molded at 230° C. continuously by 100 shots. The presence or absence of agglomeration of aluminum flakes, which would take place on the surface of the square plate molded at the 100th shot around the side gate toward the flowing direction, was visually inspected.
   ○: No agglomeration of aluminum flakes was observed on the surface of the molded square plate.
   x: Agglomeration of aluminum flakes was observed on the surface of the molded square plate.

Example 1

The respective components described in Table 2 except for the aluminum flake pigment (B-1) were blended in the amounts given using a tumbler. The blend was thus fed through a first feeding port (main feeder) of a biaxial extruder and the aluminum flake pigment was fed through a second feeding port (side feeder). These components were melt-kneaded to prepare the resin composition. MFR (230° C., 2160 g load) of the resin composition was 40 g/10 min.

Using this resin, various physical properties were measured and the appearance was evaluated. The results are shown in Table 2. The results of Table 2 reveal that the resin composition exhibited high flowability and excellent mechanical strength and physical properties, without causing agglomeration of aluminum flakes.

Comparative Example 1

The same procedures as in EXAMPLE 1 were performed, except that aluminum flakes (B-2) without any surface treatment was used in place of the aluminum flake pigment (B-1) in EXAMPLE 1.
The aluminum agglomeration test was performed using the resin composition. Agglomeration of aluminum flakes occurred on the surface of the molded article produced from the resin composition.

Comparative Example 2

The same procedures as in EXAMPLE 1 were performed, except that the propylene polymer composition (A-2) was used in place of the propylene polymer composition (A-1) in EXAMPLE 1.
In this resin composition, the flexural modulus decreased.

TABLE 2

|  | EXAMPLE 1 | COMPARATIVE EXAMPLE 1 | COMPARATIVE EXAMPLE 2 |
|---|---|---|---|
| Composition of resin (parts by weight) Propylene polymer composition |  |  |  |
| (A-1) | 100 | 100 | — |
| (A-2) | — | — | 100 |
| Aluminum flakes |  |  |  |
| (B-1) | 0.9 | — | 0.9 |
| (B-2) | — | 0.9 | — |
| Titanium oxide | 0.5 | 0.5 | 0.5 |
| Carbon black | 0.1 | 0.1 | 0.1 |
| Physical property of composition |  |  |  |
| MFR (g/10 min) | 40 | 40 | 35 |
| Spiral flow length (mm) | 144 | 144 | 142 |
| Flexural modulus (MPa) | 2050 | 2080 | 1620 |
| IZOD impact strength (J/m) | 434 | 443 | 50 |
| Agglomeration of aluminum flakes | ○ | x | ○ |

What we claim is:
1. A resin composition for automotive parts comprising:
   (1) a propylene polymer composition comprising
      50% to 70% by weight of a crystalline propylene/ethylene block copolymer (a-1) or a blend of (a-1) and a crystalline propylene homopolymer (a-2) having not greater than an equivalent weight of (a-1),
      18 to 25% by weight of an elastomeric polymer (b), wherein said elastomeric polymer (b) comprises:
         10 to 20% by weight of a copolymer (b-1) of ethylene and an α-olefin having at least 6 carbon atoms having a melt flow rate (ASTM D-1238, 230° C., 2160 g load) of 0.5 to 10 g /10 min,
         1 to 5% by weight of an ethylene/α-olefin/nonconjugated polyene random copolymer (b-2) having a melt flow rate (ASTM D-1238, 230° C., 2160 g load) of not greater than 1 g /10 min, and
         1 to 10% by weight of a hydrogenated block copolymer (b-3) that is a hydrogenated product of a block copolymer containing a polymer block of monovi- nyl-substituted aromatic hydrocarbon compound and a polymer block of a conjugated diene compound, and 15 to 25% by weight of an inorganic filler (c), wherein the total amount of the respective components is made 100% by weight, and, (2) an aluminum flake pigment comprising aluminum flakes, which surface is coated with a polymer containing as constituent units acrylic acid, an acrylic acid ester, epoxylated polybutadiene and divinylbenzene, wherein the aluminum flake pigment is contained in 0.005 to 10 parts by weight based on 100 parts by weight of the propylene polymer composition.

2. The resin composition for automotive parts according to claim 1, wherein the propylene polymer composition has a melt flow rate (ASTM D-1238, 230° C., 2160 g load) of 30 to 70 g /10 min, a flexural modulus (ASTM D-790) of 1900 to 3000 MPa, and a brittleness temperature (ASTM D-746) of −10 to −40° C.

3. The resin composition for automotive parts according to claim 1, wherein the crystalline propylene/ethylene block copolymer (a-1) is composed of a propylene homopolymer portion and a propylene/ethylene random copolymer portion, and has the melt flow rate (ASTM D-1238, 230° C., 2160 g load) of 70 to 130 g/10 min, wherein the isotactic pentad fraction (mmmm fraction) in the propylene homopolymer portion, as measured by $^{13}$C-NMR, is not less than 97%, and the content of the propylene/ethylene random copolymer portion is 5 to 20% by weight.

4. The resin composition for automotive parts according to claim 1, wherein the crystalline propylene homopolymer (a-2) has an isotactic pentad fraction (mmmm fraction) of not less than 97%, and a melt flow rate (ASTM D-1238, 230° C., 2160 g load) of 100 to 300 g/10 mm.

5. The resin composition for automotive parts according to claim 1, wherein the hydrogenated block copolymer (b-3) is at least one selected from the group consisting of a styrene/ethylene/butene/styrene block copolymer, a styrene/ethylene/propylene/styrene block copolymer and a styrene/ethylene/propylene block copolymer.

6. The resin composition for automotive parts according to claim 1, wherein the inorganic filler (c) is talc.

7. The resin composition for automotive parts according to any one of claims 1, 2-4 and 6, wherein the aluminum flake pigment contains 0.5 to 20 parts by weight of a polymer containing as constituent units acrylic acid, an acrylic acid ester, an epoxylated polybutadiene and divinylbenzene, based on 100 parts by weight of aluminum flakes.

8. The resin composition for automotive parts according to claim 1, wherein the aluminum flake pigment contains 0.5 to 20 parts by weight of a polymer containing as constituent units acrylic acid, an acrylic acid ester, an epoxylated polybutadiene and divinylbenzene, based on 100 parts by weight of aluminum flakes.

* * * * *